(12) United States Patent
Dhanda et al.

(10) Patent No.: US 9,412,403 B1
(45) Date of Patent: Aug. 9, 2016

(54) MAGNETIC RECORDING DISK DRIVE WITH POSITION ERROR SIGNAL (PES) BLOCKS IN THE DATA TRACKS FOR COMPENSATION OF TRACK MISREGISTRATION

(71) Applicant: HGST Netherlands B.V., Amsterdam (NL)

(72) Inventors: Abhishek Dhanda, San Jose, CA (US); Toshiki Hirano, San Jose, CA (US); Tetsuo Semba, San Jose, CA (US); Satoshi Yamamoto, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/834,739

(22) Filed: Aug. 25, 2015

(51) Int. Cl.
  *G11B 5/09* (2006.01)
  *G11B 5/596* (2006.01)
  *G11B 20/12* (2006.01)

(52) U.S. Cl.
  CPC ........ *G11B 5/59627* (2013.01); *G11B 5/59655* (2013.01); *G11B 20/1217* (2013.01); *G11B 2020/1232* (2013.01); *G11B 2020/1238* (2013.01); *G11B 2020/1281* (2013.01); *G11B 2020/1292* (2013.01)

(58) Field of Classification Search
  CPC .............. G11B 5/012; G11B 27/3027; G11B 5/59655; G11B 19/04; G11B 27/36; G11B 5/59627; G11B 5/59694; G11B 2220/20
  USPC .............. 360/75, 50, 48, 31, 53, 72.1, 77.06, 360/77.08
  See application file for complete search history.

(56) References Cited

U.S. PATENT DOCUMENTS

| | | | |
|---|---|---|---|
| 6,785,084 B2 | 8/2004 | Szita | |
| 6,822,818 B2 * | 11/2004 | Hamaguchi | G11B 5/012 360/48 |
| 6,987,714 B2 | 1/2006 | Watabe et al. | |
| 7,009,805 B2 | 3/2006 | Wong et al. | |
| 7,119,981 B2 | 10/2006 | Hanson et al. | |
| 7,426,086 B2 | 9/2008 | Tobari et al. | |
| 8,611,032 B2 | 12/2013 | Champion et al. | |
| 8,953,277 B1 | 2/2015 | Wu et al. | |

OTHER PUBLICATIONS

Zhang et al., "Effect of Read Head Scaling on Servo and Data Signal Characteristics for Staggered Two-Row-per Track Bit-Patterned-Media Recording", IEEE Transactions on Magnetics, vol. 46, No. 6, Jun. 2010, p. 1645.
Lianna et al., "A novel data servo method", IEEE Transactions on Magnetics, vol. 32, No. 5, pp. 3896,3898, Sep. 1996 Abstract.

* cited by examiner

*Primary Examiner* — Nabil Hindi
(74) *Attorney, Agent, or Firm* — Thomas R. Berthold

(57) ABSTRACT

A magnetic recording hard disk drive (HDD) includes, in addition to conventional servo sectors with position error signal (PES) blocks, data position error signal (DPES) blocks that are written into the data sectors when data is written in the data sectors of the data tracks. During readback the PES blocks from the servo sectors are decoded into PES values to allow the head to follow the servo track, while the DPES blocks are decoded to obtain DPES values that are used in the servo control loop to modify the head position so the head follows the center of the data track. In a shingled magnetic recording HDD, wherein the write head is at least two shingled data tracks wide, a DPES block is written in two radially adjacent data tracks when data is written into the data sectors of the shingled data tracks.

13 Claims, 6 Drawing Sheets

MAGNETIC RECORDING DISK DRIVE WITH POSITION ERROR SIGNAL (PES) BLOCKS IN THE DATA TRACKS FOR COMPENSATION OF TRACK MISREGISTRATION

BACKGROUND OF THE INVENTION

1. Field of the Invention

This invention relates generally to magnetic recording hard disk drives (HDDs), and more particularly to a HDD with compensation for track misregistration (TMR).

2. Description of the Related Art

HDDs typically have disks with data tracks with a fixed track spacing or pitch that is set during manufacturing and cannot be changed during the life of the HDD. The positioning of the read/write heads to the data tracks is accomplished by servo tracks that have angularly-spaced servo sectors that contain head positioning information, typically position error signal (PES) blocks or bursts. The servo sectors extend radially across the data tracks. As the disk rotates the read head detects the PES blocks, which are decoded into a PES that is used by the servo control system to maintain the head on the desired data track. The servo tracks also have a fixed track pitch that is set during manufacturing and that may be different from the fixed track pitch of the data tracks.

A read head following a particular position with respect to a servo track during writing may be subject to various disturbances, such as internal and external vibration. This may cause the write head to be off track when the data sectors are written in the data tracks. During readback this results in a misalignment between the read head position and the position where the data track was actually written. This is true even if the read head is in its ideal position with respect to the servo track. This discrepancy between written position and the read head positioning during readback is referred to as track misregistration (TMR). TMR results in readback data errors and is a major detractor from achieving the highest possible areal densities and high throughput in modern HDDs. The data errors may possibly be recoverable in a re-read of the data, but this increases the time to retrieve the data; or they may not be recoverable, resulting in hard errors.

HDDS may use "shingle writing", also called "shingled recording" or "shingled magnetic recording" (SMR). SMR HDDs are well-known, for example as described in U.S. Pat. No. 6,185,063 B1 and U.S. Pat. No. 6,967,810 B2. In SMR, the write head, which is wider than the read head in the cross-track direction, writes magnetic transitions by making a plurality of consecutive circular paths that partially overlap. The non-overlapped portions of adjacent paths form the shingled data tracks, which are thus narrower than the width of the write head. The data is read back by the narrower read head. The narrower shingled data tracks thus allow for increased data density. Because the number of readback errors due to TMR increases with data track "squeeze", i.e., closer spacing of the data tracks with decreasing track pitch, TMR is also a problem with SMR HDDs, which are designed to have very narrow data tracks.

What is needed is a magnetic recording disk drive that compensates for TMR during readback.

SUMMARY OF THE INVENTION

Embodiments of this invention relate to a HDD that includes, in addition to the conventional servo sectors with position error signal (PES) blocks, data position error signal (DPES) blocks that are written into the data sectors when data is written in the data sectors of the data tracks. This additional position information is available on readback for use as a predictor of the positions in which the data sectors were written. During readback the PES blocks from the servo sectors are decoded into PES values to allow the head to follow the servo track, while the DPES blocks are decoded to obtain DPES values that are used in the servo control loop to modify the head position so the head follows the center of the data track.

In a SMR HDD, wherein the write head is at least two shingled data tracks wide, the read/write electronics is configured to cause the write head to write a DPES block in two radially adjacent data tracks when writing data into the data sectors of the shingled data tracks. The DPES blocks may be written in a data sector immediately after the data sector's preamble field and sync field.

For a fuller understanding of the nature and advantages of the present invention, reference should be made to the following detailed description taken together with the accompanying figures.

DETAILED DESCRIPTION OF THE INVENTION

Figure 1:
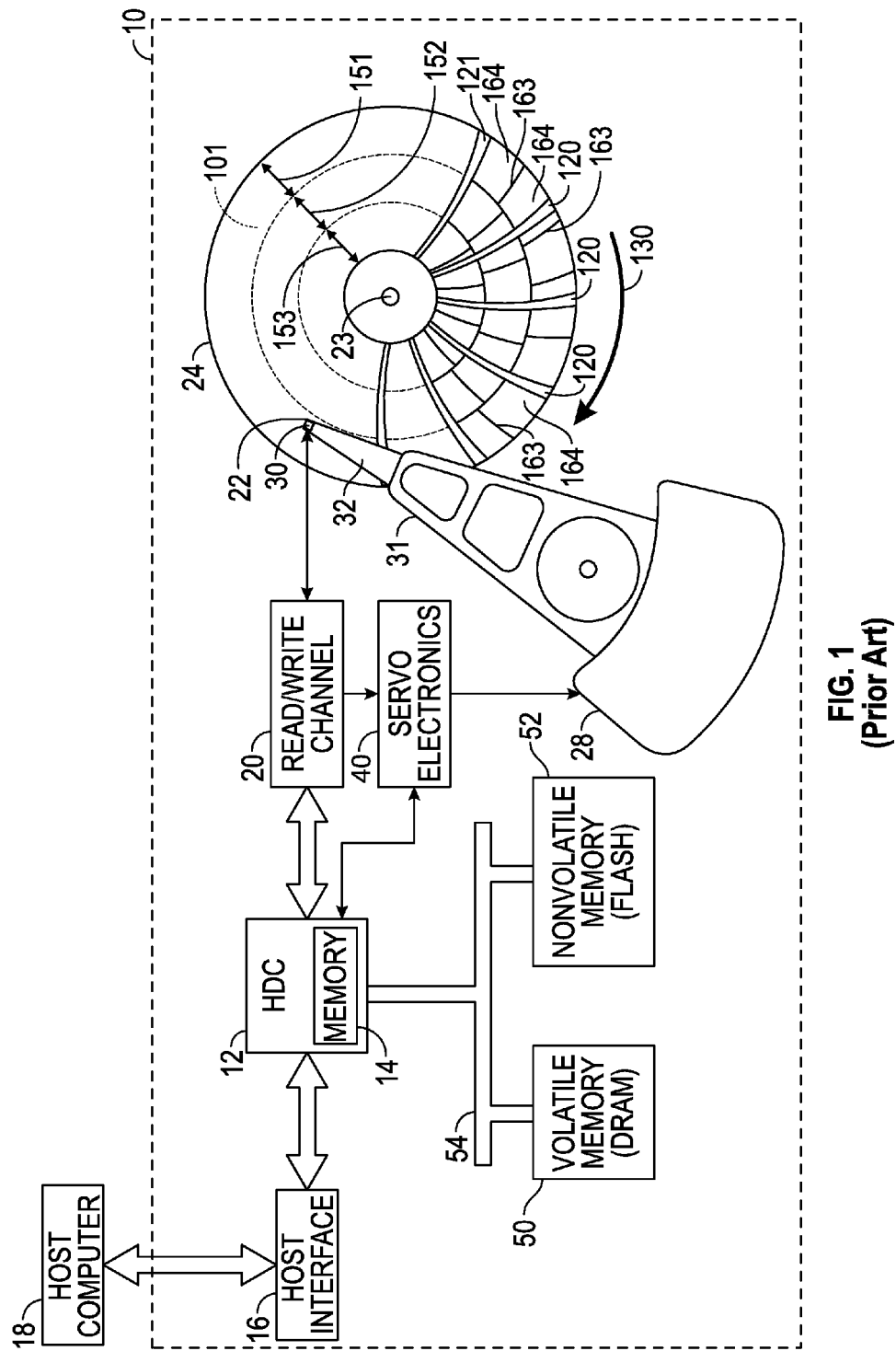
FIG. 1 is a block diagram of a magnetic recording disk drive (HDD) according to the prior art.

FIG. 1 is a block diagram of a magnetic recording disk drive (HDD) 10 according to the prior art. The HDD 10 includes a hard disk controller (HDC) 12 that can include and/or be implemented by a microcontroller or microprocessor. The controller 12 runs a computer program that is stored in semiconductor memory 14 and that embodies the logic and algorithms described further below. The memory 14 may be separate from controller 12 or as embedded memory on the controller chip. The computer program may also be implemented in microcode or other type of memory accessible to the controller 12.

The controller 12 is connected to a host interface 16 that communicates with the host computer 18. The host interface 16 may be any conventional computer-HDD interface, such as Serial ATA (Advanced Technology Attachment) or SAS (Serial Attached SCSI).

While the top view of FIG. 1 shows only a single disk 24 and associated read/write head 22, the HDD 10 typically includes a stack of disks that are mounted on a spindle 23 and rotated by a spindle motor (not shown), with each disk surface being associated with one of the heads 22. The read/write head 22 is typically a combination of an inductive write head with a magnetoresistive read head and is located on the trailing end or end face of a head carrier or slider 30. Slider 30 is supported on the actuator arm 31 by a suspension 32 that enables the slider to "pitch" and "roll" on an air-bearing generated by the disk 24 as it rotates in the direction of arrow 130. The actuator arm 31 is attached to a rotary voce coil motor (VCM) actuator 28 that rotates about pivot 29. Thus as the actuator 28 pivots, the path of slider 30 with attached read/write head 22 is not aligned with a disk radius, but is an arcuate path (like that shown by servo sectors 120 described below).

The disk 24 has a magnetic recording layer that includes radially-spaced concentric data tracks with a fixed track spacing or track pitch (TP). The HDD 10 is illustrated as a zone-bit-recording (ZBR) HDD because the data tracks are grouped radially into a number of annular data bands or zones, three of which are shown as zones 151, 152 and 153, but the invention is fully applicable to a HDD that does not use ZBR, in which case the HDD would have only a single data zone. Within each zone, the tracks are also circumferentially divided into a number of contiguous physical data sectors, such as typical data sectors 164 in the radially outer data zone 151. Each data sector 164 is preceded by a synchronization (sync) field, such as typical sync fields 163. The sync fields 163 are detectable by the read head for enabling synchronization of reading and writing in the data sectors 164.

The disk also includes radially-spaced concentric servo tracks that have a fixed track spacing or pitch (TP) that is typically different from the TP of the data tracks. Because the data TP and servo TP are different, there is not a one-to-one relationship of data tracks to servo tracks, so the radial position of each data track is identified by its nearest servo track plus an offset from that servo track. The servo tracks are not continuous but are formed as a group of angularly-spaced servo sectors 120. The servo sectors 120 contain position error signal (PES) blocks detectable by the read head for moving the head 22 to desired data tracks and maintaining the head 22 on the data tracks. The servo sectors in each servo track are aligned circumferentially or angularly with the servo sectors in the other servo tracks so that they extend across the servo tracks in a generally radial direction, as represented by radially-directed servo sectors 120. The servo sectors 120 are nondata regions on the disk that are magnetized once, typically during manufacturing or formatting of the disk, and are not intended to be erased during normal operation of the HDD. Each of the servo sectors 120 in a servo track typically contains a servo timing mark (STM) that indicates the start of the servo sector, a servo track identification (TID) code, and a portion of a pattern of magnetized blocks or high-frequency bursts that form head position error signal (PES) fields. The PES fields are detected by the read head and decoded to provide a PES value, which is a measure of how far the head is off track from the data track centerline.

Referring again to FIG. 1, the electronics associated with HDD 10 also includes servo electronics 40. In the operation of HDD 10, the read/write channel 20 receives signals from head 22 and passes servo information from the servo sectors 120 to servo electronics 40 and data signals from the data sectors 164 to controller 12. Servo electronics 40 typically includes a servo control processor that uses the PES information from the servo sectors 120 to run a servo control loop that produces a control signal representative of head radial position. The control signal is converted to a current that drives actuator 28 to position the head 22. In modern disk drives, the functions of the interface 16, HDC 12 with memory, read/write channel 20 and servo electronics 40 may be included in a single system on a chip (SOC) that also includes the necessary processors, software and hardware to perform those functions.

In the operation of HDD 10, interface 16 receives a request from the host computer 18 for reading from or writing to the data sectors 164. Controller 12 receives a list of requested data sectors from interface 16 and converts them into a set of numbers that uniquely identify the disk surface, data track and data sector. The data track number is used to extract from a table the number of the servo track closest to the desired data track and the amount of radial offset of the data track from that servo track. The numbers are passed to servo electronics 40 to enable positioning head 22 to the appropriate data sector 164. The servo control system enables the head used for reading and writing to be spatially aligned within a fraction of a track-pitch in the radial direction of the disk.

The controller 12 acts as a data controller to transfer blocks of write data from the host computer 18 through the read/write channel 20 for writing to the disks 24 by the heads 22, and to transfer blocks of read data from the disks 24 back to the host computer 18. HDDs typically include, in addition to the rotating disk storage, solid-state memory (referred to as "cache") that temporarily holds data before it is transferred between the host computer and the disk storage. The conventional cache is dynamic random access memory (DRAM), a volatile form of memory that can undergo a significant number of write/erase cycles and that has a high data transfer rate. HDDs may also include nonvolatile memory. One type of nonvolatile memory is "flash" memory, which stores information in an array of floating gate transistors, called "cells" which can be electrically erased and reprogrammed in blocks. Thus in HDD 10, the controller 12 also communicates with volatile memory 50 (shown as DRAM) and optional nonvolatile memory 52 (shown as FLASH) via data bus 54.

The HDD 10 may also be a HDD that uses "shingle writing", also called "shingled recording" or "shingled magnetic recording" (SMR). In SMR, the write head, which is wider than the read head in the cross-track direction, writes magnetic transitions by making a plurality of consecutive circular paths that partially overlap. The non-overlapped portions of adjacent paths form the shingled data tracks, which are thus narrower than the width of the write head. The data is read back by the narrower read head. The narrower shingled data tracks thus allow for increased data density. The shingled data tracks are arranged on the disk as annular bands separated by annular inter-band gaps or guard bands.

Figure 2:
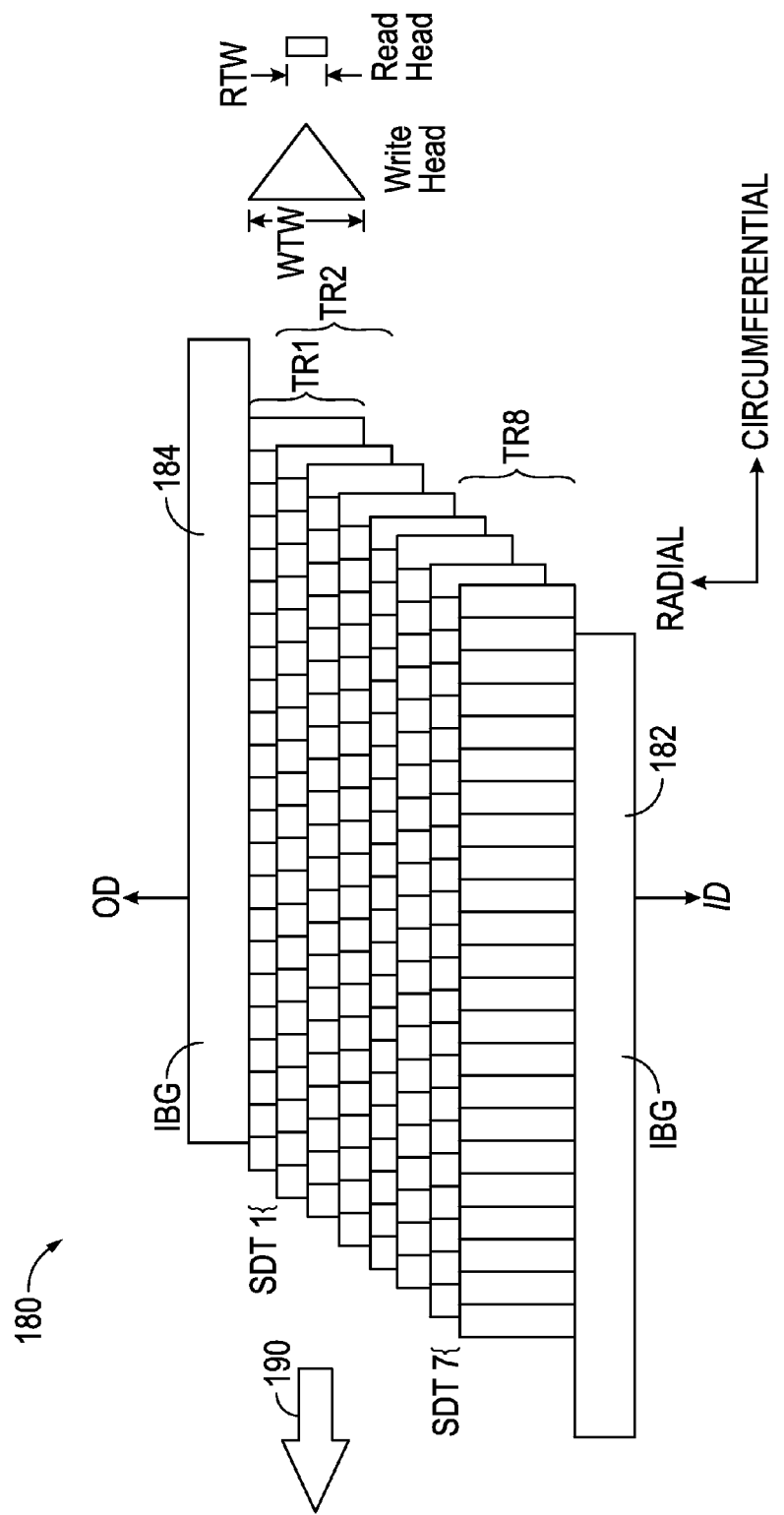
FIG. 2 is a schematic of a shingled region or band of a disk for describing the method of operation of a shingled magnetic recording (SMR) HDD.
Figure 3:
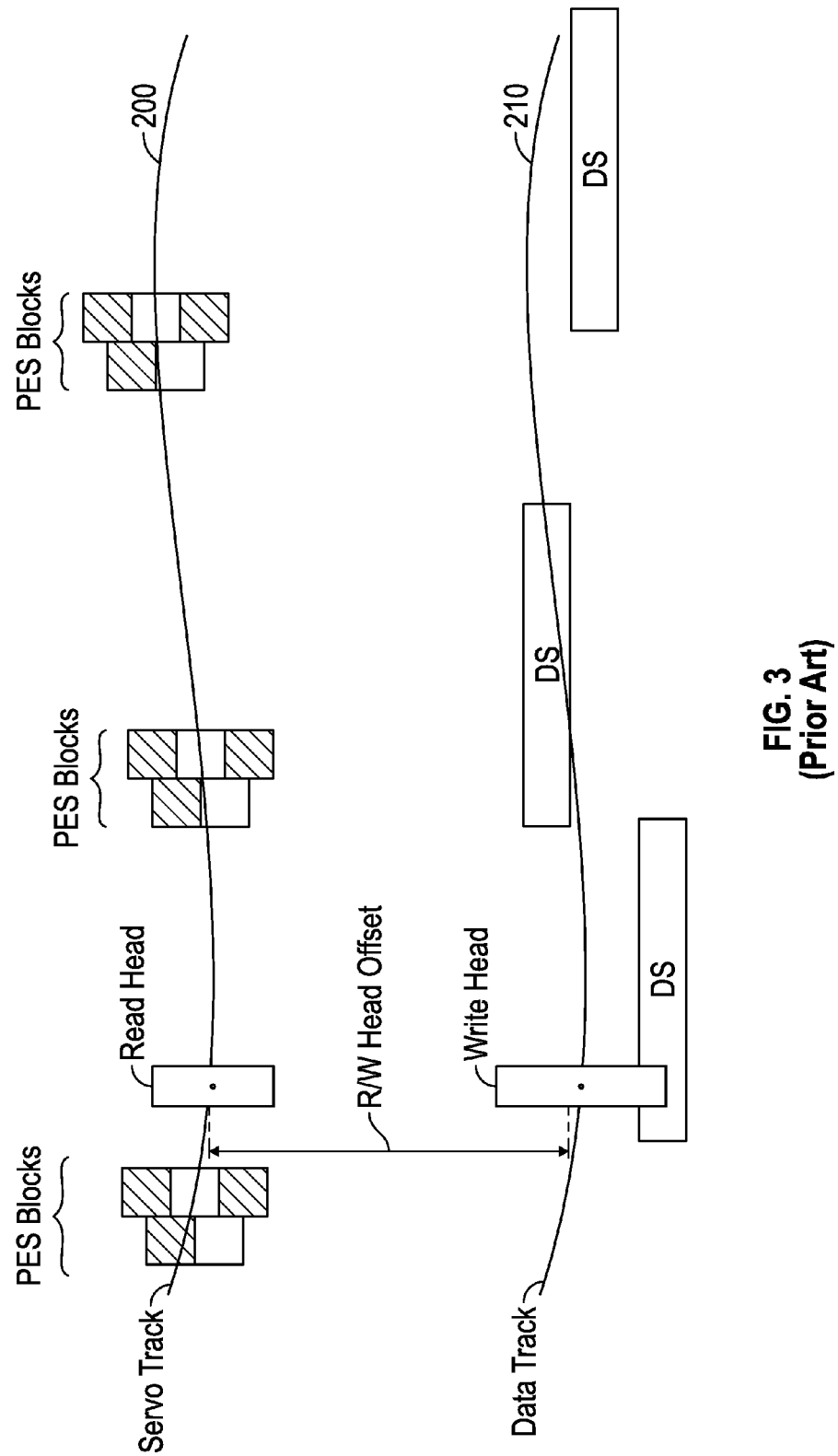
FIG. 3 is a schematic depicting a portion of a servo track and a data track, the read head following the servo track while the write head is writing to the data track.

FIG. 2 is a schematic of a shingled region or band 180 for use in describing the method of SMR. A typical band will have a large number, i.e., several hundred or thousand, shingled data tracks (SDTs); however only 7 are shown in band 180 for ease of illustration. Band 180 has inter-band gaps (IBGs) 182, 184 that separate it from radially adjacent bands. The write head makes successive paths or tracks (TRs) to form the SDTs, which in the example of FIG. 3 are written in the direction from disk outside diameter (OD) to disk inside diameter (ID). The write pole tip of the write head has a cross-track width (WTW) that is wider than the sensing edge of the read head cross-track width (RTW). When writing data, the write head generates paths of magnetic transitions, represented by the vertical lines, as the recording layer moves in the direction of arrow 190. For example, the actuator positions the write head to write data along track 1 (TR1), then moves the write head to write data along track 2 (TR2). The writing of data along TR2 overwrites a portion of the previously written TR1 and thus "squeezes" the data of TR1 to thereby form the first shingled data track (SDT1). In the example of FIG. 2, the shingled data tracks are written in the direction from the disk OD to ID. However, a disk drive can be formatted such that writing of the shingled data tracks in one or more bands can be from ID to OD, with different bands being written in different directions. SMR HDDs also have servo tracks with servo sectors, and data tracks with a TP different from the TP of the servo tracks.

Track misregistration (TMR) is a major detractor from achieving the highest possible areal densities and high throughput in modern HDDs. The result of TMR is that during readback the data cannot be detected, resulting in readback data errors. The data errors may possibly be recoverable in a re-read of the data, but this increases the time to retrieve the data; or they may not be recoverable, resulting in hard errors. TMR occurs because during writing, when the read head is detecting the PES blocks to follow a servo track, disturbances such as internal and external vibration will cause the write head to move of track.

FIG. 3 is a schematic depicting a portion of a servo track and a data track, with the read head following the servo track while the write head is writing to the data track. The path 200 represents the ideal path the read head should follow along the servo track to maintain the write head on the desired data track. Path 200 is shown as being the center of a servo track, but it could be some location or offset between adjacent servo tracks. Path 200 includes multiple servo sectors, each with PES blocks, and is depicted as other than a straight line to reflect runout. The write head has a cross-track offset from the read head and ideally would write each data sector (DS) along a path 210 that would replicate the path 200 of the read head. However, disturbances during writing will cause the read head to deviate from path 200. This will cause the data sectors to be written off track, i.e., other than precisely on path 210, as shown in FIG. 3. The number of readback errors due to TMR increases with data track "squeeze", i.e., closer spacing of the data tracks with decreasing track pitch, because it becomes more difficult to locate and track-follow the center of the data tracks. This is especially the case with SMR HDDs, which are designed to have very narrow data tracks.

Embodiments of this invention relate to a HDD that includes, in addition to the servo sectors with PES blocks, data position error signal (DPES) blocks that are written into the data sectors when data is written in the data sectors of the data tracks. This additional position information is available on readback for use as a predictor of the positions in which the data sectors were written. During readback the PES blocks from the servo sectors are decoded into PES values to allow the head to follow the servo track, while the DPES blocks are decoded to obtain DPES values that are used in the servo control loop to modify the head position so the head follows the center of the data track.

Figure 4:
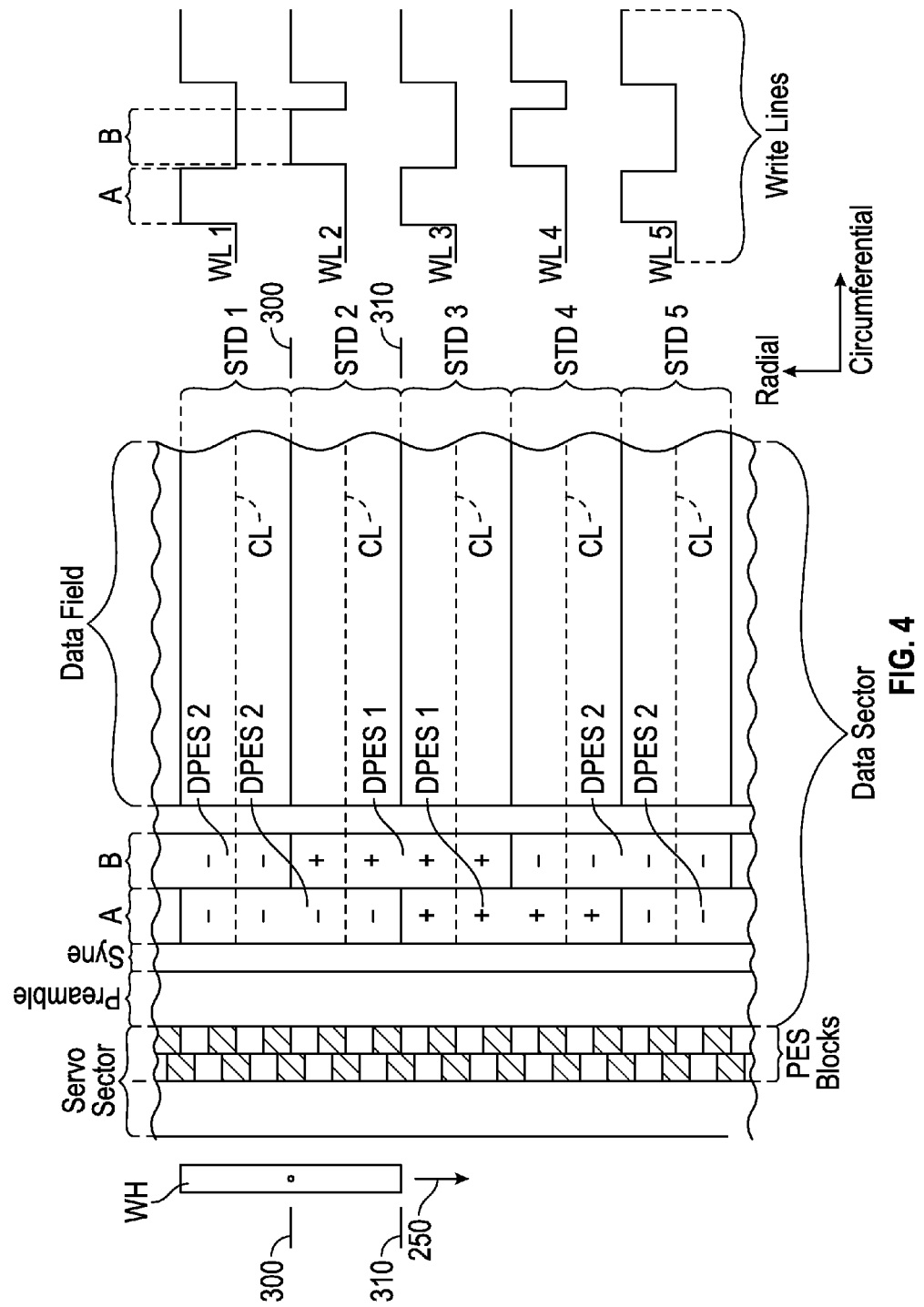
FIG. 4 is a schematic of portion of the shingled magnetic recording disk according to an embodiment of the invention and depicts a single servo sector with position error signal (PES) blocks preceding a single data sector that includes two circumferentially or angularly adjacent data position error signal (DPES) fields A and B.

FIG. 4 is a schematic of portion of a shingled magnetic recording disk according to an embodiment of the invention. FIG. 4 depicts a single servo sector with PES blocks preceding a single data sector that includes two circumferentially or angularly adjacent data position error signal (DPES) fields A and B. Five shingled data tracks (SDT1 through SDT5) with centerlines (CLs) are illustrated. The data sector also includes a conventional preamble and sync field that precedes the data field. There are two different DPES blocks, represented as positive (+) (DPES1) and negative (−) (DPES2) bursts. These represent high frequency magnetic transitions but phase shifted by 180 degrees. Each DPES block has a radial width of at least two SDTs. The DPES1 and DPES2 blocks in each A and B field alternate in the radial direction across the SDTs. The DPES blocks in field A are shifted radially by one SDT from the DPES blocks in field B.

The manner in which the DPES blocks are written when the data in the SDTs are written will be explained with the write gate signal lines shown in FIG. 4. The read/write electronics is configured or adapted to generate write signals that will open and close a write gate to control the timing of the write head to write the DPES bursts and the data in the data sectors. The read/write electronics will generate a write signal to write a DPES block in a first angular position (the A field) when writing data in a data sector of a designated data track and a write signal to write a DPES block in a second angular position (the B field) adjacent the first angular position when writing data in a data sector of a data track radially adjacent to the designated data track. The write head (WH) has a radial width of at least two SDTs and is shown as being radially aligned with line 300, which is at the boundary between SDT1 and SDT2. As the disk rotates past the WH the write gate will open for a length of time corresponding to field A, as shown by Write Line 1 (WL1), during which the WH will write the bursts of DPES2 that span SDT1 and SDT2. The write gate will then close at field B and after field B has passed the write gate will open to allow the WH to write data in the data field of SDT1. Because the WH has a radial width of at least two SDTs it will write in SDT1 and in the lower adjacent track SDT2. The actuator will then move the WH in the direction of arrow 250 by one SDT to be aligned with line 310, which is at the boundary between SDT2 and SDT3. Then as the disk rotates past the WH the write gate will remain closed for the length of time corresponding to field A, as shown by WL2. The write gate will then open at field B, during which the WH will write the bursts of DPES1 that span SDT2 and SDT3. The write gate will then close after field B has passed and will open to allow the WH to write data in the data field of SDT2. Because the WH has a radial width of at least two SDTs it will overwrite what was previously written in SDT2 and will also write in SDT3. This process continues as the WH is shifted radially by SDT track widths to SDT3, SDT4 and SDT5, as shown by Write Lines 3, 4 and 5, respectively.

In one embodiment there is one data sector for each servo sector. However, the number of data sectors per track will typically be different at different annular bands on the SMR disk, while the number of servo sectors per track is typically the same for all tracks on the disk. In the preferred embodiment the DPES blocks are written into each data sector. However, the method may also function if less than all data sectors are used, for example use of the DPES blocks from every other data sector may be sufficient.

In FIG. 4, the DPES blocks are available immediately after the preamble and sync fields. The preamble and sync fields occur at the beginning of every data sector, and also immediately after every servo sector in order to re-sync the data after the servo interruption. This DPES location immediately after the preamble and sync fields is a very convenient location because the DPES information is then delivered to the servo electronics in synchronization with the servo sectors.

Figure 5A:
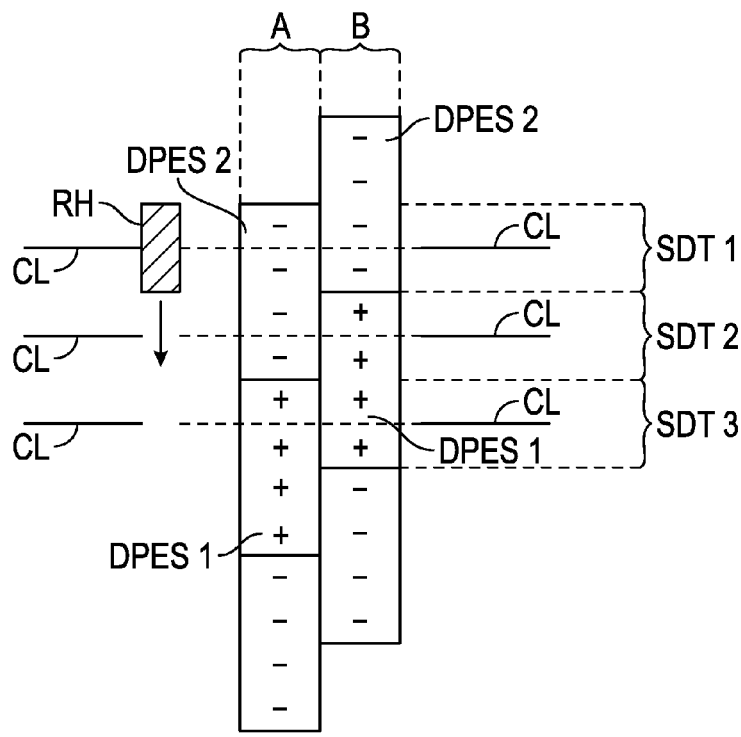
FIG. 5A is an illustration of the read head (RH) and DPES blocks in fields A and B for three shingled data tracks (SDTs).
Figure 5B:
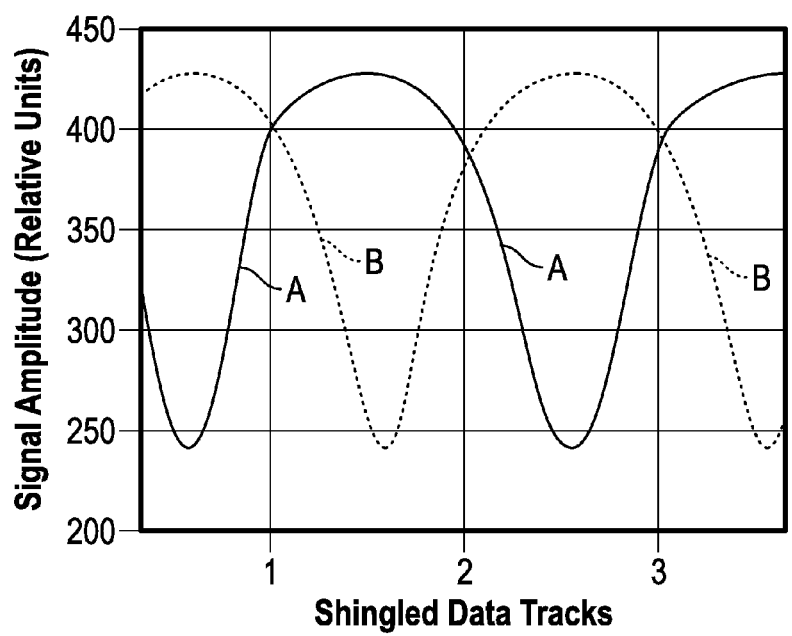
FIG. 5B is a graph of read signal amplitude from the DPES fields A and B as a function of radial position of the read head as the read head moves from the centerline of SDT1 to the centerline of SDT3.

FIG. 5A is an illustration of the read head (RH) and DPES blocks in fields A and B for three SDTs, and FIG. 5B is a graph of read signal amplitude from the DPES fields A and B as a function of radial position of the read head as the read head moves from the centerline (CL) of SDT1 to the CL of SDT3. When the RH is aligned with the CL of SDT1, the signal from each of field A and B will be at approximately the maximum because the RH is detecting only DPES2 bursts from each field. As the RH moves in the direction of the arrow toward the CL of SDT2 the signal from field A will remain at approximately the maximum because it is still detecting only DPES2 bursts. However, the signal from field B will begin to decrease because the RH is also detecting DPES1 bursts which will begin to cancel the signal from the DPES2 bursts. The signal from field B will be at approximately the minimum at halfway between SDT1 and SDT2 where the signals from the DPES2 and DPES1 bursts will cancel each other. Similarly, as the RH continues to move in the direction of the arrow toward the CL of SDT3 the signal from field A will begin to decrease because the RH is also detecting DPES1 bursts which will begin to cancel the signal from the DPES2 bursts. The signal from field A will be at approximately the minimum at halfway between SDT2 and SDT3 where the signals from the DPES2 and DPES1 bursts will cancel each other. However, the signal from field B will remain at approximately the maximum because it is still detecting only DPES1 bursts. The A and B graphs can be used by the servo electronics to decode the DPES blocks into digital DPES values that represent the radial position of the RH relative to the CLs of the SDTs. The digital DPES values are input to the servo control system.

Figure 6:
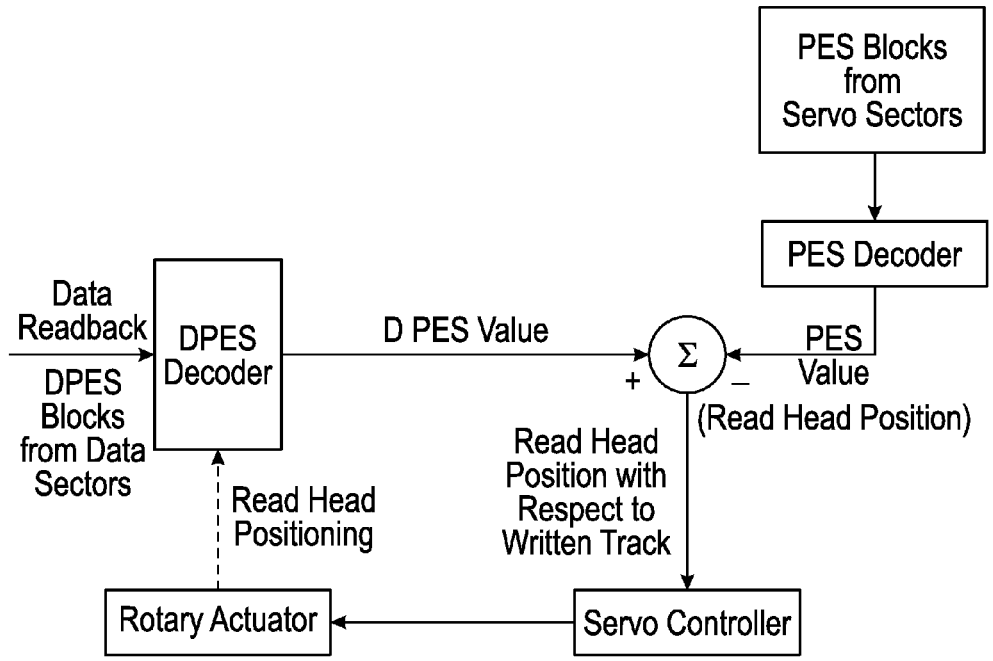
FIG. 6 is a block diagram for explaining how the DPES blocks are used in the servo loop for read head tracking during data readback.

FIG. 6 is a block diagram for explaining how the DPES blocks are used in the servo loop for read head tracking during data readback. The read head is moved by the actuator to the servo track and servo track offset corresponding to the data track to be read. The read head now follows the servo track (the path of the angularly spaced servo sectors). As the servo sectors pass the read head, the read head detects the PES blocks which are decoded by the PES decoder into digital PES values. When the read head reads the data sectors between the servo sectors it detects the DPES blocks, which are decoded by the DPES decoder into digital DPES values. The DPES values and PES values are then summed at the summing junction to obtain the difference, i.e., DPES-PES. This value is input to the servo controller to control the rotary actuator to reposition the read head and maintain it over the path where the data sectors were actually written, i.e., the centerline of the SDT. The DPES values are thus used to modify the PES values into the servo controller.

Figure 7:
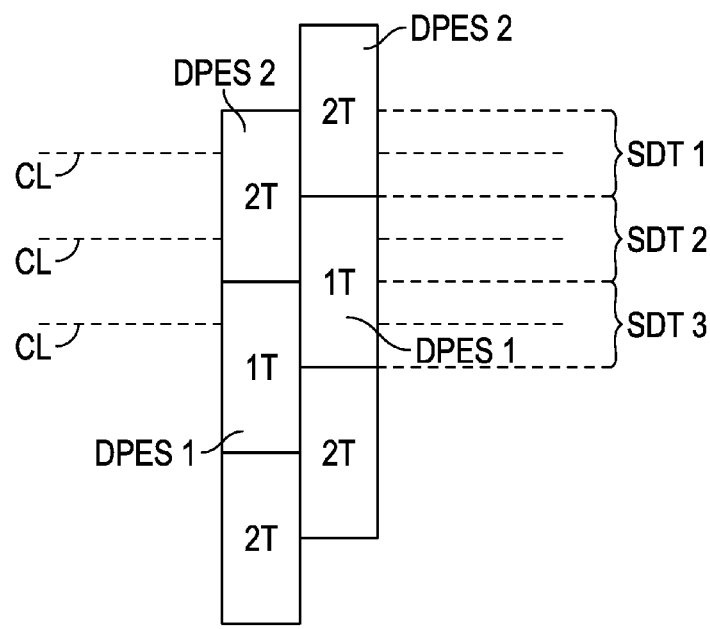
FIG. 7 is a representation of another type of well-known bursts at two different frequencies that may be used for the DPES bursts.

In FIGS. 4 and 5A, the DPES blocks are represented as positive (+) (DPES1) and negative (−) (DPES2) bursts. These represent high frequency magnetic transitions but phase shifted by 180 degrees. These are one type of well-known bursts used as PES blocks in conventional servo sectors and are decoded using a well-known decoding technique. However, the invention is not limited to a specific type of blocks or bursts used for the DPES blocks. Any of the well-known PES bursts and their associated decoding techniques can function as the DPES blocks. FIG. 7 is a representation of another type of well-known PES bursts. The DPES blocks may be bursts at two different frequencies. For example, DPES1 may be a 1T tone (101010 . . . ) (alternating positive/negative or up/down magnetization) pattern and DPES2 may be a 2T tone (110110110 . . . ).

The operation of the HDD functions as described above may be implemented in hardware or microcode or as a set of computer program instructions stored in memory and executable by a processor, such as the HDC, or a separate controller or microprocessor in the SOC. The controller performs logical and arithmetic operations based on the program instructions stored in memory, and is thus capable of performing the functions described above and represented in the figures.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A shingled magnetic recording disk comprising:
a plurality of radially spaced shingled data tracks arranged into a plurality of annular bands separated by inter-band gaps, the data tracks including data sectors;
a plurality of radially spaced servo tracks having a plurality of angularly spaced servo sectors extending across the servo tracks and data tracks, the servo sectors containing position error signal (PES) blocks; and
a plurality of angularly adjacent first and second data position error signal (DPES) blocks within the data sectors and extending radially across the data tracks in a band, each DPES block having a radial width of at least two data tracks, the first and second DPES blocks alternating in the radial direction and the DPES blocks in one angular position being shifted radially from the DPES blocks in the angularly adjacent position by one data track.

2. The disk of claim 1 wherein the first DPES blocks are bursts of magnetic transitions at a specified frequency and the second DPES blocks are bursts of magnetic transitions at said specified frequency and phase shifted from the first DPES bursts.

3. The disk of claim 1 wherein the first DPES blocks are bursts of magnetic transitions at a first frequency and the second DPES blocks are bursts of magnetic transitions at a second frequency different from said first frequency.

4. A shingled magnetic recording disk drive comprising;
the disk of claim 1;
a read head for reading data and DPES blocks from the data sectors and PES blocks from the servo tracks;
a write head having a radial width of at least two data tracks for generating the shingled data tracks by writing in overlapping tracks;
a head carrier supporting the read head and write head;
an actuator connected to the carrier for moving the read and write heads radially across the disk;
read/write electronics coupled to the write head and configured to cause the write head to write a DPES block in at least two radially adjacent data tracks when writing data into the data sectors; and
servo electronics coupled to the actuator for adjusting the radial position of the read head in a data track in response to the DPES blocks read by the read head.

5. The disk drive of claim 4 wherein each data sector includes a preamble field and a sync field located immediately after each servo sector and wherein the DPES blocks are written immediately after the preamble field and sync field.

6. The disk drive of claim 4 wherein the servo electronics includes a PES decoder and a DPES decoder and is configured to cause the read head to follow a data track by modifying PES values decoded from the PES blocks in the servo sectors with DPES values decoded from the DPES blocks in the data sectors.

7. The disk drive of claim 6 wherein the servo electronics includes a processor for running a servo control loop that receives the decoded PES values from the PES blocks read by the read head from the servo sectors and outputs read head position to the actuator, wherein the processor is adapted to modify said read head position in response to DPES values decoded from the DPES blocks read by the read head from the data sectors.

8. A shingled magnetic recording disk drive comprising:

a shingled magnetic recording disk comprising
- a plurality of radially spaced shingled data tracks arranged into a plurality of annular bands separated by inter-band gaps, the data tracks including data sectors;
- a plurality of radially spaced servo tracks having a plurality of angularly spaced servo sectors extending across the servo tracks and data tracks, the servo sectors containing position error signal (PES) blocks; and
- a plurality of angularly adjacent first and second data position error signal (DPES) blocks within the data sectors and extending radially across the data tracks in a band, each DPES block having a radial width of at least two data tracks, the first and second DPES blocks alternating in the radial direction and the DPES blocks in one angular position being shifted radially from the DPES blocks in the angularly adjacent position by one data track;

a read head for reading data and DPES blocks from the data sectors and PES blocks from the servo tracks;

a write head having a radial width of at least two data tracks for generating the shingled data tracks by writing in overlapping tracks;

a head carrier supporting the read head and write head;

an actuator connected to the carrier for moving the read and write heads radially across the disk; and read/write electronics coupled to the write head and configured to generate a write signal to write a DPES block in a first angular position when writing data in a data sector of a designated data track and a write signal to write a DPES block in a second angular position adjacent said first angular position when writing data in a data sector of a data track radially adjacent to said designated data track.

9. The disk drive of claim 8 wherein the first DPES blocks are bursts of magnetic transitions at a specified frequency and the second DPES blocks are bursts of magnetic transitions at said specified frequency and phase shifted from the first DPES bursts.

10. The disk drive of claim 8 wherein the first DPES blocks are bursts of magnetic transitions at a first frequency and the second DPES blocks are bursts of magnetic transitions at a second frequency different from said first frequency.

11. The disk drive of claim 8 wherein each data sector includes a preamble field and a sync field located immediately after each servo sector and wherein the DPES blocks are written immediately after the preamble field and sync field.

12. The disk drive of claim 8 further comprising servo electronics coupled to the actuator for adjusting the radial position of the read head, the servo electronics including a PES decoder and a DPES decoder and configured to cause the read head to follow a data track by modifying PES values decoded from the PES blocks in the servo sectors with DPES values decoded from the DPES blocks in the data sectors.

13. The disk drive of claim 8 further comprising servo electronics coupled to the actuator for adjusting the radial position of the read head, the servo electronics including a PES decoder, a DPES decoder and a processor for running a servo control loop that receives decoded PES values from the PES blocks read by the read head from the servo sectors and outputs read head position to the actuator, wherein the processor is adapted to modify said read head position in response to DPES values decoded from the DPES blocks read by the read head from the data sectors.

\* \* \* \* \*